United States Patent [19]

Sasaki et al.

[11] Patent Number: 5,015,518
[45] Date of Patent: May 14, 1991

[54] GRAPHITE BODY

[75] Inventors: Yoshito Sasaki, Tokyo; Kunio Takaishi, Yamanashi, both of Japan

[73] Assignee: Toyo Carbon Co., Ltd., Tokyo, Japan

[21] Appl. No.: 361,766

[22] Filed: May 30, 1989

Related U.S. Application Data

[63] Continuation of Ser. No. 863,171, May 14, 1986, abandoned.

[30] Foreign Application Priority Data

May 14, 1985 [JP]  Japan ................. 60-102463
May 14, 1985 [JP]  Japan ................. 60-102464

[51] Int. Cl.$^5$ .................... B32B 23/02; H05B 7/14
[52] U.S. Cl. ................... 428/192; 428/33; 428/53; 428/56; 428/120; 428/167; 428/358; 428/364; 428/400; 428/408; 428/58; 373/91; 373/92
[58] Field of Search ........... 428/33, 57, 58, 192, 428/367, 397, 398, 399, 400, 408, 53, 54, 56, 119, 120, 167, 189, 358, 364, 397, 689, 704; 373/91, 92, 88, 93, 94, 95, 96; 403/331, 381

[56] References Cited

U.S. PATENT DOCUMENTS

| | | | |
|---|---|---|---|
| 1,133,513 | 3/1915 | Thompson | 403/331 |
| 2,650,943 | 9/1953 | Leuchs et al. | 373/91 |
| 3,014,119 | 12/1961 | Jörgensen | 373/92 |
| 3,090,086 | 5/1963 | Fata | 403/381 |
| 4,019,298 | 4/1977 | Johnson | 403/381 |
| 4,659,442 | 4/1987 | Naterstal et al. | 373/92 |

FOREIGN PATENT DOCUMENTS

| | | | |
|---|---|---|---|
| 0421357 | 2/1911 | France | 373/92 |
| 0008781 | of 1884 | United Kingdom | 373/92 |
| 251349 | 10/1884 | United Kingdom | 403/381 |
| 13737 | of 1901 | United Kingdom | 403/381 |
| 180580 | 6/1922 | United Kingdom | 403/331 |

OTHER PUBLICATIONS

Carpentry, Mechanics Magazine, May 1, 1824 (see FIG. No. 1 and 2).

*Primary Examiner*—Ellis P. Robinson
*Assistant Examiner*—Donald J. Loney
*Attorney, Agent, or Firm*—Oblon, Spivak, McClelland, Maier & Neustadt

[57] ABSTRACT

A graphite body which is capable of connecting a plurality of the graphite bodies one by one. The graphite body includes one connecting end surface having a T-shaped mound and the other connecting end surface having an inverted T-shaped groove so that the graphite bodies may be connected by means of the mound and groove. The mound and groove each have a width linearly varied in the longitudinal direction thereof.

9 Claims, 6 Drawing Sheets (a)

(b)

(c)

FIG.13 (a)
FIG.13 (b)
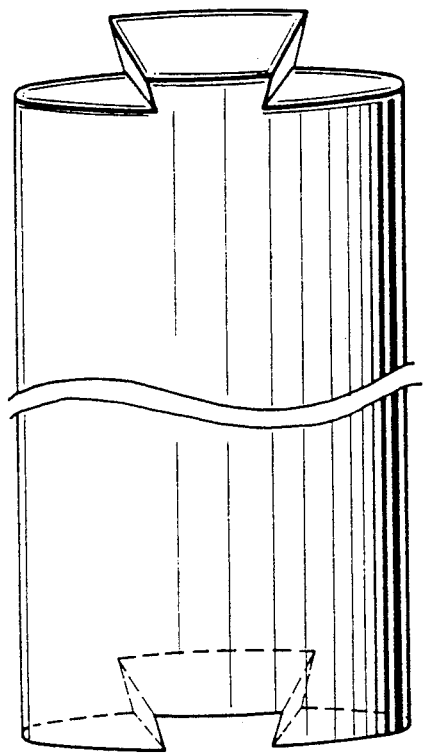
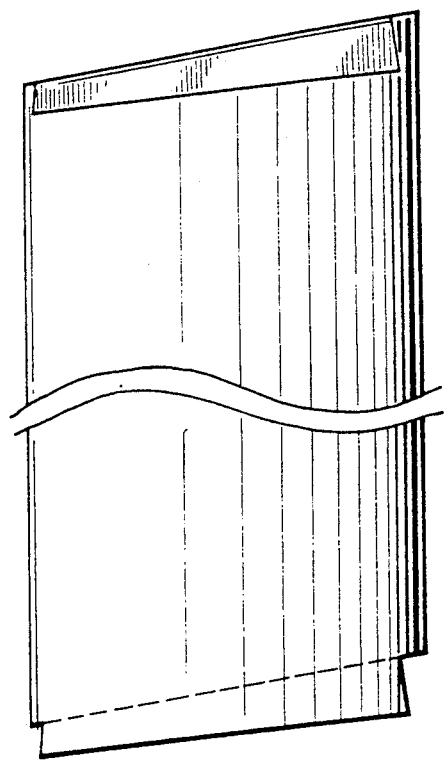
FIG.13 (c)
FIG.13 (d)
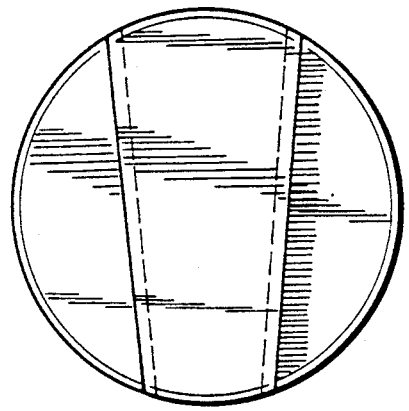
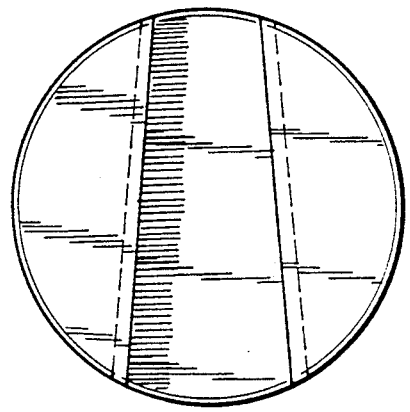

GRAPHITE BODY

This application is a continuation of application Ser. No. 863,171, filed on May 14, 1986, now abandoned.

BACKGROUND OF THE INVENTION

1. Field of the Invention

This invention relates to a graphite body, and more particularly to a graphite body used for a graphite arc furnace electrode and the like to be connected at least two graphite bodies together.

2. Description of the Prior Art

Electrolytic cells or electric arc furnaces are continuously operated without interruption or with interruption for an extremely short period of time by successively connecting a supplementary graphite electrode to a graphite electrode which is consumed in use. In order to have the graphite electrodes connected, screw connection utilizing a threaded nipple, locking bar-type connection, adhesion-type connection or the like are known in the art.

In connecting the graphite electrodes, the connecting portion of the graphite electrode must have high strength, because it is subjected to fairly heavy weight of the graphite electrode. Also, the graphite electrodes must be connected as tightly as possible at the connecting portion thereof so that electric current may smoothly flow through the connection portion. Furthermore, the connection of the graphite electrode must be effected as readily as possible.

Conventionally, the screw connection is most commonly used for connecting the graphite electrode, because it satisfies the above requirements in comparatively good balance. However, the screw connection is not sufficient to provide an intimate and tight connection between the graphite electrodes. In order to connect the graphite electrode tightly, it is required to have the graphite electrode provided with a precisely threaded nipple and socket at each end, which results in the final cost of graphite electrode to be extremely high due to the excessive amount of works for forming the threaded nipple and socket. In addition, the connecting operation of the electrode is troublesome and complicated. The locking bar-type connection and adhesion-type connection of the electrode each have problems with respect of the tightness and strength of the connection, and are limited to use for specific applications.

SUMMARY OF THE INVENTION

The present invention has been made in view of the foregoing disadvantage of the prior art while taking notice of the fact that a T-shaped mound or inverted T-shaped groove provided at end surfaces of a graphite body permits the graphite body to connect in high strength and sufficient tightness. The T-shaped mound has a substantially full extension across the middle portion of the end surface of the graphite body gradually decreasing in width longitudinally toward one end, and is formed into a shape having upwardly diverging two side surfaces, an enlarged flat upper surface and a narrow base (the cross section of the mound has a shape of inverted trapezoid). The inverted T-shaped groove is to receive the corresponding T-shaped mound and is formed on the end surface of the graphite body to which the graphite body having the T-shaped mound is connected. The formation of the T-shaped mound and the inverted T-shaped groove on the graphite body is relatively easy as compared with that of the threaded nipple and socket or locking-bar. Furthermore, the provision of the T-shaped mound and the inverted T-shaped groove on the graphite body makes it feasible to connect at least two graphite bodies together extremely in a simple manner.

Accordingly, it is an object of the present invention to provide a graphite body which is capable of simply and effectively connecting at least two graphite bodies together.

It is another object of the present invention to provide a graphite body suitable for use in a graphite arc furnace electrode or the like which is capable of securely and tightly connecting at least two graphite bodies together.

In accordance with the present invention, there is provided a graphite body to be connected to other graphite body. The graphite body includes at least one connecting end surface and a T-shaped mound or an inverted T-shaped groove. The mound or groove is provided on the connecting end surface extending across the middle portion thereof, and is gradually decreased in width longitudinally toward one end.

In one preferred embodiment of the present invention, the graphite body includes one connecting end surface having the T-shaped mound provided thereon and the other connecting end surface having the inverted T-shaped groove provided thereon.

In another preferred embodiment of the present invention, the graphite body includes at least one connecting end surface which is slanted against a horizontal plane and is provided with the T-shaped mound or inverted T-shaped groove extending in the slanting direction of the end surface at the middle portion thereof so that it may be gradually decreased in width toward one end.

The graphite body thus formed is conveniently used for connecting at least two graphite bodies vertically. The graphite bodies connected together in this manner do not loose when lateral force is accidentally applied to the connecting portion, but instead the graphite bodies are fitted closely.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like parts throughout; wherein:

FIGS. 5(a) and 5(b) to 9(a) and 9(b) each are a schematic plan view and a schematic front view showing each of examples of a T-shaped mound in a graphite body according to the present invention;

FIGS. 13(a), 13(b), 13(c), and 13(d) are a front view, a side view, a plan view and a bottom view showing a further modification of the graphite body shown in FIG. 10, respectively.

DETAILED DESCRIPTION OF THE PREFERRED EMBODIMENTS

Now, a graphite body according to the present invention will be described hereinafter with reference to the accompanying drawings.

Although a graphite body of the present invention is not limited to specific applications, it is typically used for a graphite arc furnace electrode. When the graphite body is used as a graphite arc furnace electrode, at least two graphite bodies are connected, most typically, to be connected one by one consecutively in the longitudinal direction. The graphite body of the present invention is basically formed into a cylindrical, rectangular parallelopiped or cubic shape. However, it may be formed into any desired shape other than the above-described basic shape so long as it has at least one connecting end surface and preferably two connecting end surfaces.

Figure 1:
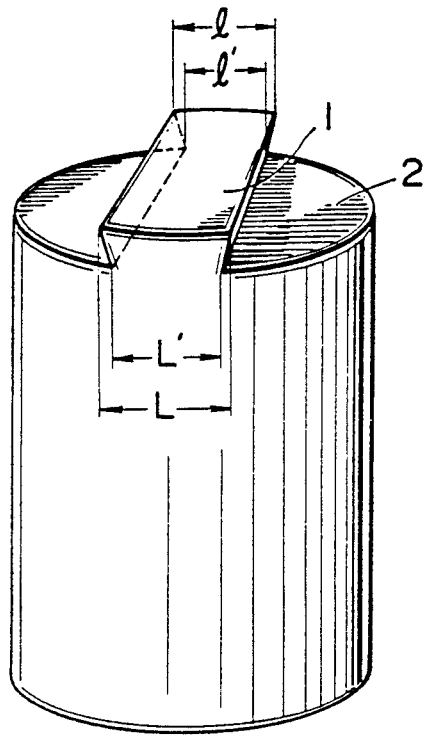
FIGS. 1 to 4 are perspective views illustrating an embodiment of a graphite body according to the present invention.
Figure 2:
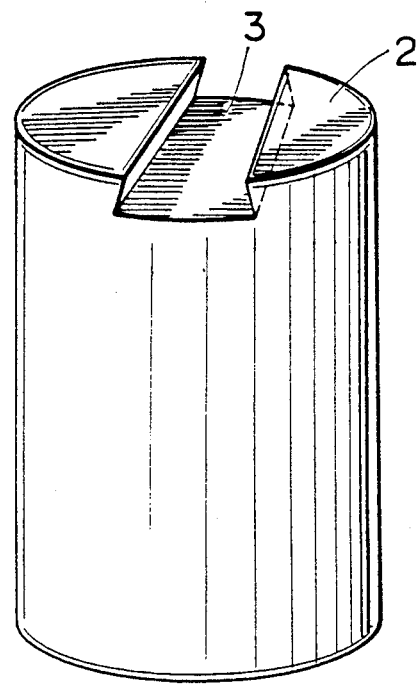
Figure 3:
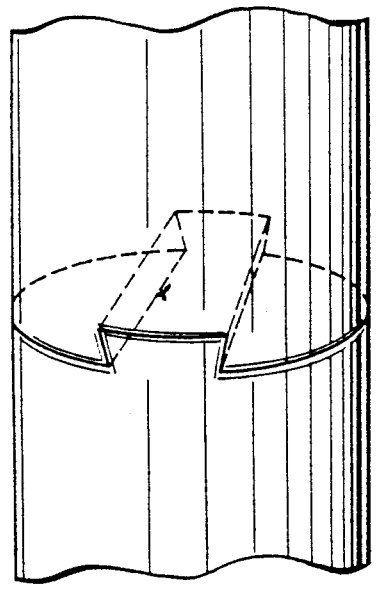
Figure 4:
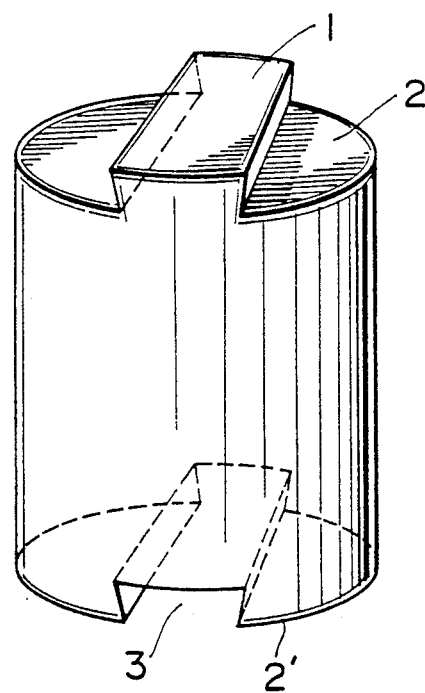

FIGS. 1 to 3 illustrate an embodiment of a graphite body according to the present invention, which is formed into a cylindrical shape and adapted to be longitudinally connected at the upper and lower surfaces thereof. The graphite body shown in FIG. 1 is cylindrical in shape and includes a T-shaped mound 1 and a connecting surface 2. FIG. 2 shows a graphite body which includes a connecting end surface 2 and an inverted T-shaped groove 3 to receive the corresponding T-shaped mound. FIG. 3 schematically shows the connection between the graphite bodies shown in FIGS. 1 and 2. The graphite body of the illustrated embodiment, as shown in FIG. 4, may be constructed so as to have the T-shaped mound 1 on the upper connecting end surface 2 thereof and the inverted T-shaped groove 3 on the lower connecting end surface 2' thereof.

Figure 9:
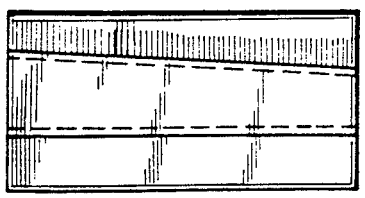
Figure 9:
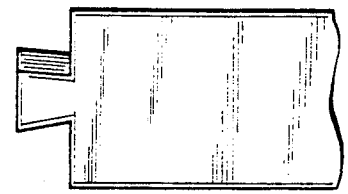
Figure 8:
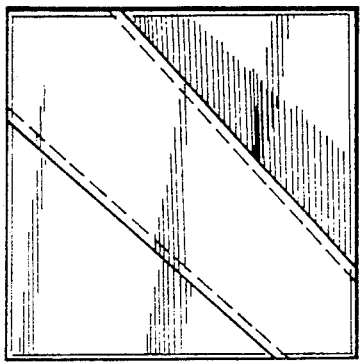
Figure 8:
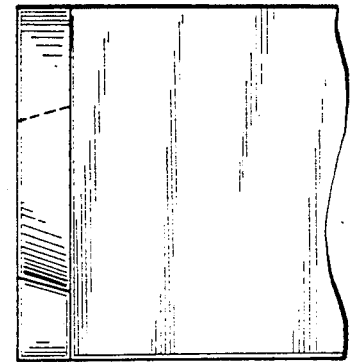
Figure 7:
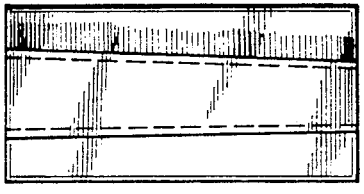
Figure 7:
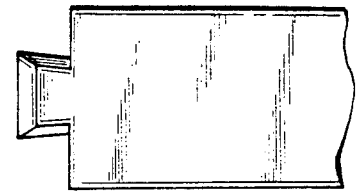
Figure 6:
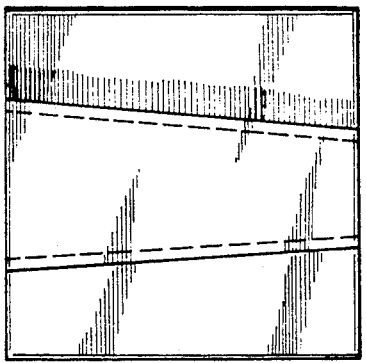
Figure 6:
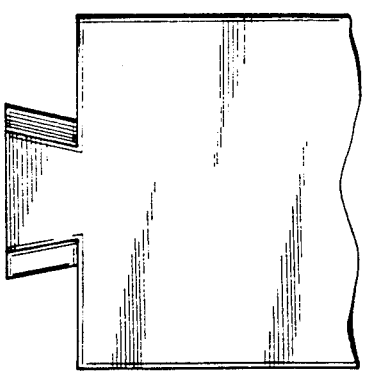
Figure 5:
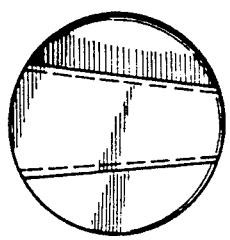
Figure 5:
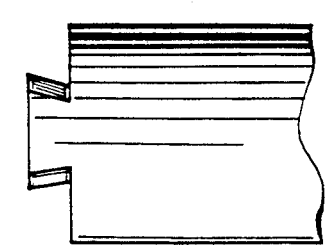

FIGS. 5 to 9 show various examples of the T-shaped mound which is formed on the connecting end surface of the graphite body, in which FIGS. 5a to 9a are schematic plan views of the graphite bodies having the T-shaped mound on the connecting end surface thereof, and FIGS. 5b to 9b are schematic side views of FIGS. 5a to 9a, respectively. The connecting end surface shown in FIG. 5 is circular in shape (graphite body is cylindrical). The connecting end surface shown in FIG. 6 is square in shape and the T-shaped mound is formed on the connecting end surface extending between two opposed sides thereof. The connecting end surface shown in FIG. 8 is square in shape and the T-shaped mound is formed on the connecting end surface extending along one diagonal line thereof. The connecting end surface shown in FIG. 7 is rectangular in shape and the T-shaped mound having a slanting upper surface is formed on the connecting end surface. The connecting end surface shown in FIG. 9 is rectangular in shape and the T-shaped mound of which only one side is tapered is formed on the connecting end surface. The shape of the inverted T-shaped groove to receive the corresponding T-shaped mounds shown in FIGS. 5 to 9 will be readily understood to those skilled in the art. Also, it is to be understood that the connecting end surface and T-shaped mound are not limited to the specific configurations as exemplified above, but it is possible to combine various types of connecting end surfaces and the T-shaped mounds which are different in shape, arrangement, height, width, longitudinal and lateral inclinations or tapers, and the like.

The T-shaped mound formed on the connecting end surface of the graphite body according to the present invention includes a raised horizontal upper surface as shown in the drawings. The T-shaped mound is formed on the middle portion of the connecting end surface extending in any one direction thereof and is enlarged from a base of the mound to the horizontal upper surface thereof, which is expressed as $L>L'$, $l>l'$ by the reference characters in FIG. 1 and is linearly and longitudinally varied in width toward one direction, which is expressed as $L>l$, $L'>l'$ by the reference characters in FIG. 1.

Figure 10:
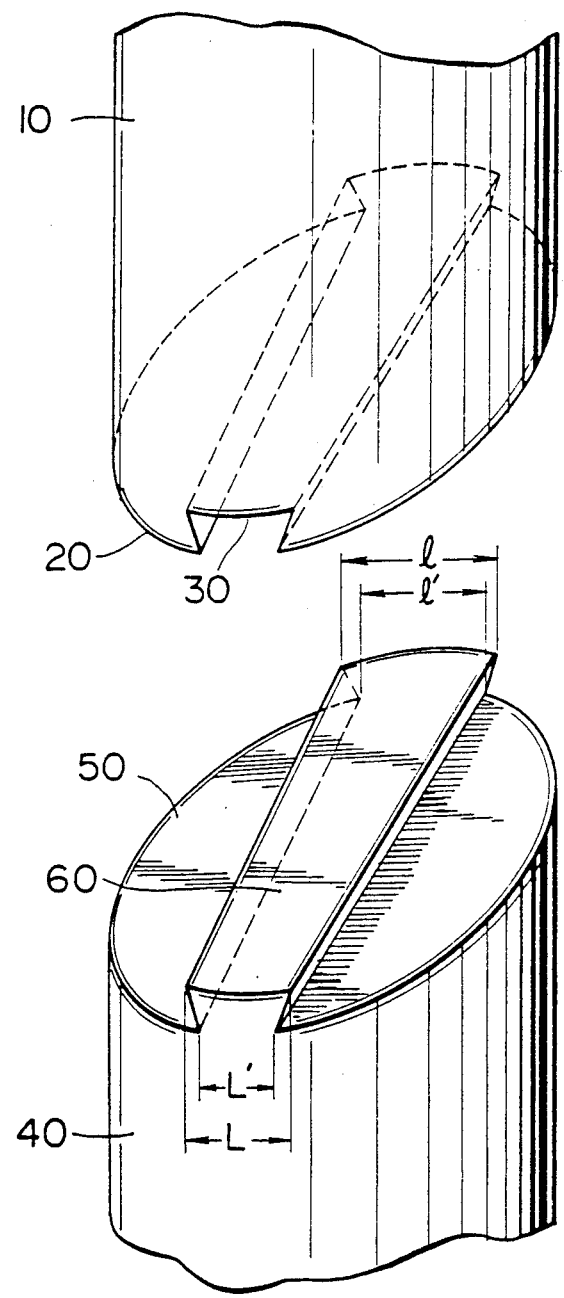
FIG. 10 is a schematic perspective view showing another embodiment of a graphite body according to the present invention.

FIGS. 10 to 13 illustrate another embodiment of a graphite body according to the present invention. FIG. 10 is a fragmentary perspective view showing a pair of graphite bodies of a cylindrical shape to be connected together. In FIG. 10, reference numeral 10 designates a graphite body having an inverted T-shaped groove 30 on a lower connecting end surface 20 thereof. Reference numeral 40 designates a corresponding graphite body having a T-shaped mound 60 on an upper connecting end surface 50 thereof. The upper and the lower end surfaces (not shown) of the graphite bodies 10 and 40 are formed into a horizontal shape when two graphite bodies are connected together, whereas the T-shaped mound and the inverted T-shaped groove may be formed on the end surfaces, respectively, when a number of the graphite bodies are successively connected to one another.

The connecting end surfaces 20 and 30 each are flat and slanted at the same angle against a horizontal plane of the graphite body. In the illustrated embodiment, the T-shaped mound 60 likewise has an upper flat surface slanted in substantially the same manner as the connecting end surface 50 and is formed on the substantially middle portion of the connecting end surface 50. The T-shaped mound linearly and gradually varies in width from one end of the mound to the other end thereof. Preferably, the width of the mound is gradually enlarged from a lower side of the connecting end surface to an upper side thereof along the slanting direction of the connecting end surface. Also, the T-shaped mound is gradually enlarged from a base thereof connected to the connecting end surface to an upper surface thereof. When using reference characters $L$, $L'$, $l$ and $l'$ which designate dimensions of the mound 60 in FIG. 10, the longitudinal and lateral variation in width of the T-shaped mounds are expressed as $L<l$, $L'<l'$ and $L<L'$, $l<l'$.

Figure 11:
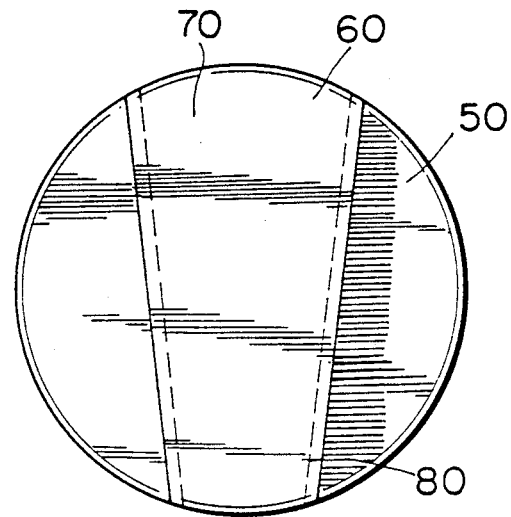
FIGS. 11(a), 11(b) and 11(c) each are a plan view, a fragmentary front view and a fragmentary side view showing a modification of the graphite body shown in FIG. 10.
Figure 11:
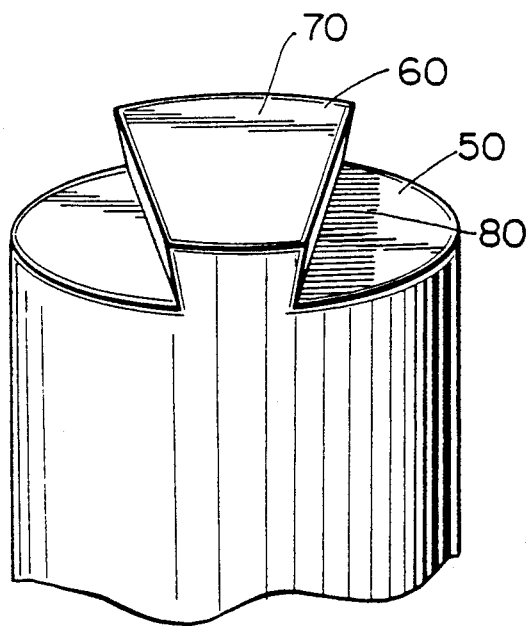
Figure 11:
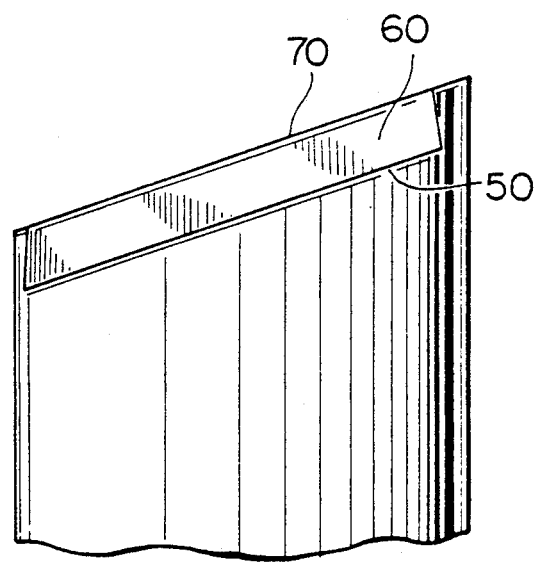

In order to more clearly illustrate such relationships as described above, an example of the graphite body having the T-shaped mound on the upper connecting end surface thereof is shown in FIG. 11. FIGS. 11(a), 11(b) and 11(c) show the top view, front view and side view of the graphite body, respectively. As is apparent from FIG. 11, the graphite body has the connecting end surface 50 slanted against the horizontal plane of the graphite body and the T-shaped mound 60 extending in the slanting direction of the connecting end surface 50 at the middle portion thereof. The T-shaped mound 60 gradually enlarges in width from a lower side of the connecting end surface to the upper side thereof along the slanting direction thereof. The mound 60 has a flat upper surface 70 slanted at the same angle as the connecting end surface 50 and is gradually enlarged from a base portion 80 thereof connected to the connecting end surface 50 to the upper surface 70.

The inverted T-shaped groove to receive the T-shaped mound 60 is formed on the connecting end surface of the corresponding graphite body so that it may be tightly fitted in an interlocking relationship with the T-shaped mound. The inverted T-shaped groove extends in the slanting direction of the connecting end surface at the middle portion thereof. The groove gradually enlarges in width from a lower side of the connecting end surface to the upper side thereof in the slanting direction thereof. The groove has a flat bottom surface slanted in the same manner as the connecting end surface and gradually enlarges in width from the upper end to the bottom.

Figure 12:
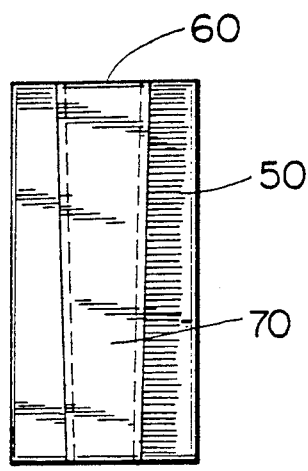
FIGS. 12(a), 12(b) and 12(c) each are a plan view, a fragmentary front view and a fragmentary side view showing another modification of the graphite body shown in FIG. 10.
Figure 12:
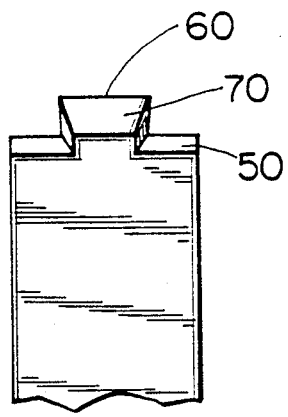
Figure 12:
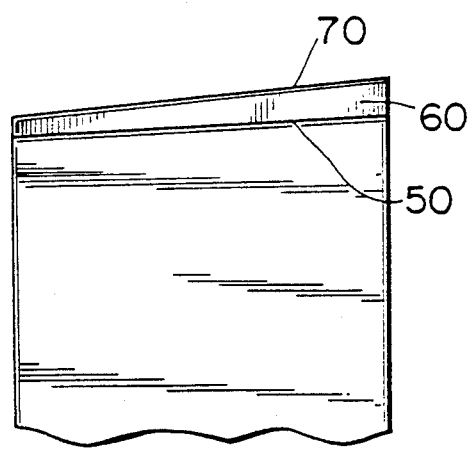

FIGS. 12 and 13 each show another modification of the graphite body shown in FIG. 10. FIG. 12 shows a graphite body which is of substantially rectangular parallelopiped configuration and includes an upper connecting end surface 50 having a T-shaped 60 mound thereon. In FIG. 12, FIG. 12(a) is a plan view of the graphite body, FIG. 12(b) is a fragmentary front view thereof and FIG. 12(c) is a fragmentary side view. In the graphite body shown in FIG. 12, the T-shaped mound 60 not only has a width gradually enlarged from a lower side of the connecting end surface 50 to an upper side thereof along the slanting direction thereof but has a height gradually increased along the direction of enlargement of the width. Accordingly, the T-shaped mound has an upper surface 70 of a larger gradient than the connecting end surface 50.

FIG. 13 shows a graphite body of a cylindrical shape having a T-shaped mound formed on an upper connecting end surface thereof and an inverted T-shaped groove formed on a lower connecting end surface thereof. The graphite body shown in FIG. 13 is used to be connected with a plurality of the graphite bodies of the same construction one by one in the longitudinal direction. In FIG. 13, FIG. 13(a) is a front view of the graphite body, FIG. 13(b) is a side elevation view thereof, FIG. 13(c) is a plan view thereof, and FIG. 13(d) is a bottom view thereof.

In each of the illustrated embodiments, a plurality of the graphite bodies are connected together one by one by interlocking the T-shaped mound formed on the upper connecting end surface of the graphite body in the inverted T-shaped groove cut in the lower connecting end surface of the graphite body. This connection makes it possible to consume the graphite body completely not being fractured shortly before it is used up. In this instance, since the weight of the graphite bodies connected together is supported by the upper graphite body, the mound and groove are preferably formed to have a width enlarged from the lower side of the connecting end surface to the upper side thereof along the slanting direction thereof.

In this embodiment, the weight of the graphite bodies connected together is supported by not the uppermost graphite body. However, until the weight support is shifted from the second uppermost graphite body to the uppermost graphite body, the connected uppermost graphite body is preferably retained by a suitable means so as to prevent it from slipping down from the second graphite body.

If the weight of the graphite bodies connected together is supported by the lowermost graphite body contrary to the manner described above or it is convenient to fit the T-shaped mound formed on the lower connecting end surface of the graphite body into the inverted T-shaped groove formed on the upper connecting end surface of the graphite body, the width of each of the mound and groove is formed to be gradually enlarged from the upper side of the connecting end surface to the lower side thereof along the slanting direction thereof. In addition, when it is desired to vary the height of each of the mound and groove, the mound and groove each should be formed in such a manner that the height is gradually increased in the direction of enlargement of the width.

When the graphite bodies are connected together by interlocking the inverted T-shaped groove formed on the upper connecting end surface of the graphite body with the T-shaped mound formed on the lower connecting end surface of the graphite body and they are supported by means of the lower graphite body, it will be readily understood to those skilled in the art that the width of each of the groove and mound is formed to be gradually increased toward the upper side of the connecting end surface along the slanting direction thereof. Thus, it will be noted that the mound and groove are formed so as to be more tightly fitted along the direction in which the graphite body is to slide due to the inclination of the connecting end surface. The inclination of the connecting end surface, when the graphite bodies are vertically connected together, permits the connecting end surfaces of the graphite bodies to be firmly and tightly fitted together all the time promoted by the longitudinal and lateral divergence of the mound and groove. In addition, it is not readily released even when lateral force is accidentally applied to the connecting portion.

In each of the above embodiments, the T-shaped mound is preferably formed in the longitudinal direction of the connecting end surface if the connecting end surface has directionality, such as, for example, an elliptic or rectangular shape. However, when the length in the lateral direction of the connecting end surface is extremely smaller than that in the longitudinal direction, the T-shaped mound may be formed in the lateral direction so that it may resist strain and stress exerted on the mound.

When the connecting end surface is quadrate in shape such as square, rectangular, or the like, the T-shaped mound is typically formed to extend between the central portions of two opposite sides of the connecting end surface. However, it may be formed in the direction of the diagonal line. Accordingly, it is to be understood that the direction in which the T-shaped mound is provided is optimumly determined as desired in light of various parameters such as the configuration of the connecting end surface, the weight of the graphite body, the feasibility of formation of the T-shaped mound and inverted T-shaped groove, and the like.

As explained hereinabove, the inverted T-shaped groove to receive the T-shaped mound is formed to have a flat bottom surface, of which the width is larger than that of the upper opening which lies on the level of the connecting end surface and is linearly varied from one end of the bottom surface to the other end thereof.

Reference will now be made in connection with the T-shaped mound. However, the inverted T-shaped groove will be also readily understood with reference to the following description, because the groove is to receive the T-shaped mound. The height, width and lateral inclination of the T-shaped mound may be determined as desired depending upon the configuration of the connecting end surface. In this instance, when at least two graphite bodies are connected together in such a manner that one of the graphite bodies is supported and the other is suspended therefrom, the T-shaped mound and the inverted T-shaped groove are designed so that they may exhibit the coupling strength to a degree of preventing the other graphite body from dropping from the one graphite body and the breakage from occurring at either the mound or the groove. However, in general, the width of the mound is within a range of ⅓ to ⅔ and preferably 5/12 to 7/12 based on the length of lateral direction of the connecting end surface at the central point of the height and length of the mound, and the lateral inclination is within a range of 45 to 87 degrees and preferably 60 to 85 degrees with respect to the connecting end surface or horizontal surface. The height of the mound is not specified to a specific value, because it is determined as desired depending upon the configuration of the overall graphite body and that of the connecting end surface. However, in general, it is determined to satisfy the requirements of the lateral inclination, width at the central point and the longitudinal expansion. The maximum width at the upper surface of the mound and the minimum width at the base thereof is ¾ or less and ¼ or more based on the lateral length of the connecting end surface, respectively.

The longitudinal expansion of the T-shaped mound permits the mound and the groove to fit tightly and closely and facilitates the connecting operation. Also, it is effective to prevent the graphite body from falling due to disengagement of the graphite bodies even when, by some reasons, the connection is set up at side or somewhat in slant. At any rate, the graphite body is required to have the connecting portion which is capable of exhibiting tight coupling. In order to meet such requirement, it is required to form the mound and the groove with high precision. In the event the mound and groove each are not provided with the longitudinal expansion, the more precisely the working of the mound and groove is carried, the more difficult the fitting between the mound and the groove is, and eventually the mound can not fit into the groove easily without damaging the tight engagement at the connecting portion. This is particularly true when the graphite body which is considerably heavy in weight.

In the present invention, the T-shaped mound and groove each are provided with the longitudinal expansion as described above. This makes it possible to interlock the mound and groove by fitting the minimum width end of the mound into the maximum width end of the groove and then sliding the mound into the groove. Thus, the provision of the mound and groove in the present invention not only facilitates the engagement therebetween even when they are finished with the highest precision, but ensures the engagement with high tightness even when the finishing is not effected in a high precision. The longitudinal expansion of the mound cannot be expressed at a given numerical value, because it is varied depending upon the length of the mound. However, it must be formed to have an angle which allows the engagement between the mound and the groove to be initiated by downwardly fitting the maximum width end of the groove directly on at least the tip portion of the minimum width end of the mound. Preferably, the angle is set to allow the mound and groove to be fitted freely by up and/or down movement to each other at the position of ¼ to ½ on the mound or groove along the longitudinal direction thereof, because this substantially reduces the load for the fitting operation.

However, it should be understood that the longitudinal expansion of the mound at an excessive angle decreases the strength of the connection between the groove and the mound. Thus, it should be determined within a range that the maximum width of the upper surface of the mound is ¾ or less based on the length of the lateral direction of the connecting end surface, and the minimum width of the base of the mound is ¼ or more based thereon.

The lateral inclination is necessary on both sides of the mound, however, the longitudinal expansion could be on only one side. The formation of the longitudinal expansion on only one side of the mound is convenient as the case may be, since it facilitates the formation of the mound and the fitting operation. When the connecting end surface of the graphite body is square or rectangular in shape, the central line of the mound typically lies in parallel to one side of the quadrate connecting end surface. However, it may be formed in such a manner that the central line of the mound has an angle with respect to that of the quadrate connecting end surface unless such formation adversely affects the strength of the connection between the groove and the mound and the fitting operation. For example, the central line may be determined to coincide with one diagonal line of the quadrate. In any event, it is desired that the central line of the mound is to pass through the center of the quadrate, because the weight of the graphite body connected together can be supported with a good balance.

Although the upper surface of the T-shaped mound is flat, it is not required to be parallel to the connecting end surface. For example, the upper surface of the mound may be slanted to have a height increased toward the direction of enlargement of the width.

The use of adhesive for connecting the graphite bodies exhibits several auxiliary effects. The adhesive not only ensures the tight engagement between the mound and the groove even when lateral force which acts to release the engagement is accidentally applied to the connection therebetween, but also remarkably enhances the strength of the connection as compared with the case that the weight of the graphite body is supported only by the engagement between the mound and the groove. Thus, it will be noted that the use of adhesive loosens the requirements for the strength of the connection, such as, for example, numerical values of width of the mound and the like. Further, the adhesive makes it possible to connect the graphite bodies together with sufficient tightness and to permit an electric current to more smoothly flow through the connection. For this purpose, the conductive adhesive is preferably used.

The use of adhesive exhibits the various advantages, however, it should be decided by comparing the advantages with cost of the adhesive, complication in operation due to the use and the like.

As is apparent from the foregoing, the present invention is adapted to use in such a manner that at least two graphite bodies are connected together. Typically, the graphite body of the present invention is used for a graphite arc furnace electrode to be connected one by one as it is consumed. The graphite body of the present invention not only highly facilitates the formation of the connecting portion of the graphite body and its connecting operation, but also connects the graphite bodies with sufficient tightness and ensures high bond strength at the connecting portion.

While preferred embodiments of the invention have been described with a certain degree of particularity with reference to the drawings, obvious modifications and variations are possible in the light of the above teachings. It is therefore to be understood that within the scope of the appended claims, the invention may be practiced otherwise than as specifically described.

What is claimed as new and desired to be secured by Letters Patent of the United States is:

1. A graphite arc furnace electrode comprising:
   an elongated graphite body having substantial length and diameter;
   connecting end surfaces formed on said graphite body for connecting said graphite body to another graphite body;
   a T-shaped mound formed on one connecting end surface extending across the middle portion thereof; an inverted T-shaped groove formed on the other connecting end surface extending across the middle portion thereof; said mound and groove being gradually decreased in width longitudinally toward one end thereof, the width of said mound being in a range of ⅓ to ⅔ based on the length of lateral direction of said connecting end surface at the central point of height and length of said mound, said mound having a lateral inclination of 45 to 87 degrees with respect to said connecting end surface, the maximum width of an upper surface of said mound being ¾ or less based on the length of lateral direction of said connecting end surface and the minimum width of a base of said mound being ¼ or more based thereon.

2. The graphite arc furnace electrode as defined in claim 1, wherein the width of said T-shaped mound or groove is enlarged from a lower side of said connecting end surface to an upper side thereof in the slanting direction thereof.

3. The graphite arc furnace electrode as defined in claim 1, wherein said T-shaped mound is formed in the longitudinal direction of said connecting end surface.

4. The graphite arc furnace electrode as defined in claim 1, wherein said T-shaped mound extends between the central portions of two opposite sides of said connecting end surface.

5. The graphite arc furnace electrode as defined in claim 1, wherein said T-shaped mound extends in the direction of a diagonal line of said connecting end surface.

6. The graphite arc furnace electrode as defined in claim 1, wherein said connecting end surface is slanted against a horizontal plane of the graphite body.

7. The graphite arc furnace electrode as defined in claim 6, wherein said T-shaped mound is formed in the longitudinal direction of said connecting end surface.

8. The graphite arc furnace electrode as defined in claim 6, wherein said T-shaped mound extends between the central portions of two opposite sides of said connecting end surface.

9. The graphite arc furnace electrode as defined in claim 6, wherein said T-shaped mound extends in the direction of a diagonal line of said connecting end surface.

* * * * *